Figure 1:
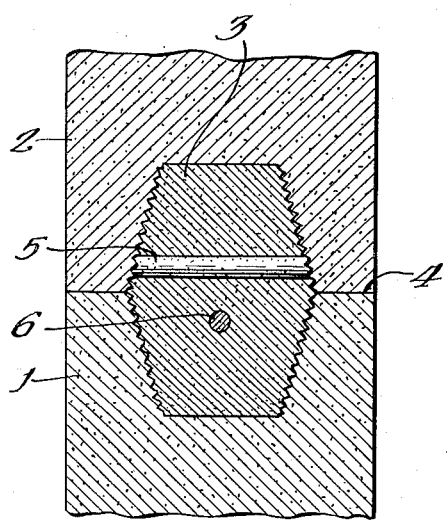

Jan. 24, 1961  E. C. THOMAS  2,969,251
CARBON ELECTRODE JOINT
Filed Feb. 15, 1960

Inventor:
Edward C. Thomas

United States Patent Office 2,969,251
Patented Jan. 24, 1961

2,969,251
CARBON ELECTRODE JOINT

Edward C. Thomas, Lewiston, N.Y., assignor to Great Lakes Carbon Corporation, New York, N.Y., a corporation of Delaware Filed Feb. 15, 1960, Ser. No. 8,703

10 Claims. (Cl. 287—127)

This invention relates to a mechanism for carbon and graphite electrode joints.

A problem of long standing in the use of carbon and graphite electrodes in the electrothermic production of steel is one of securing one electrode to another in the electrode column. On numerous instances the male member of the joint, commonly referred to as the nipple, will become loosened from either the upper or lower female sections of the electrodes, referred to as sockets. This may result from the upper or lower sections (or both) fracturing due to differential thermal stresses, or the loosening may merely be the result of vigorous, though normal, concomitant mechanical forces consistent with the total environment under which such electrodes are used. Once any of the above mentioned three members become loosened from the other, the dynamic action of the electrode column continues the "unwinding" process until complete disengagement occurs.

An object of this invention is to provide a mechanism which will lock the male member (the nipple) to each of the adjoining female members (the sockets) in such manner as to prevent them from disengagement when in use in the furnace.

It is an additional objective of this invention to provide a method for manufacturing the parts of this proposed mechanism.

It is also an object of this invention to provide a locking mechanism for carbon electrode joints which is operative primarly when the joint is in service in the furnace. In the event, however, that due to some eventuality the joint must be disassembled (at handling temperatures) in order to remove the male member from either or both of the female members, it is readily and uniquely possible to do so without detracting in any way from the future or resumed functional use of the nipple or its locking mechanism.

It is well known that certain carbon and/or graphite electrode bodies have marked anisotropic properties. (The term carbon body as used in this application and in the claims is meant to designate either a gas baked (to 950° C.) carbonaceous body or a graphitized body.) Noteworthy among these properties is that of thermal expansion. This invention proposes to utilize this property in providing a locking mechanism for carbon electrode joints as previously noted. More specifically this invention proposes to utilize this property in a sense of differential expansion by a singular method of fabrication.

In principle the method of operation of the aforementioned locking mechanism is as follows: One or more radial or transverse holes are provided in each of the upper and lower portions or segments of the male member of a carbon electrode joint, said member being hereinafter referred to as the nipple. These holes may be circular, rectangular or any geometry in cross-section, but preferably they should be essentially circular—such as are provided by a drill.

Although it is not essential that the aforementioned holes be established before the final machining operation is performed on the body of the nipple, it is considered to be expedient to do so. After the radial or transverse holes have been drilled into each end of the stock from which the nipple is to be machined, an insert rod or plug of carbon and/or graphite material having singular thermal expansion properties is inserted. Although it is not essential to the function of this process, it is preferable if the engagement between the hole in the nipple and the rod or plug of singular thermal expansion properties is a snug or tight fit. Following the assembly of the above described rods into the holes provided therefor, the nipple is then machined in the normal manner.

In providing the insert rods or plugs having singular thermal expansion properties, the anisotropic characteristics of carbon and/or graphite are utilized to their fullest extent. Specifically, it is the purpose of this phase of the invention to provide insert rods or plugs having a greater total linear expansion than that of the cores which were displaced when the radial or transverse holes were established in each end or portion or segment of the nipple. More generally the coefficient of thermal expansion (CTE) along the axis of the rod or insert material (its long or longitudinal direction) is and must be greater than the transverse coefficient of thermal expansion of the nipple or nipple stock.

In use the locking device as described above operates in the following manner. Two female and one male members are assembled into a typical electrode joint using the various previously described methods. When an electrode column thus assembled goes into service on a furnace, it and its several joints become heated. As the joints assembled with the previously described locking mechanism become heated, a differential expansion occurs between the insert rods or plugs, and the nipple. The insert rods or plugs, having a higher axial or longitudinal CTE, force themselves against and frictionally engage the electrode socket walls. In a preferred embodiment the electrode sockets and nipple are threadably engaged to each other. With this type of arrangement, the impressed ends of the insert rods or plugs bear against the socket threads and act in shear to prevent disengagement.

In the event that it is desirable to disassemble the joint at room or moderate temperatures, this may be easily accomplished since the insert rods or plugs retract on cooling to their original length, and disassembly can proceed in a normal manner.

It is well known that the anisotropic properties of carbon, including graphite, are reflected in solid bodies of artificial graphite fabricated therefrom. It is also well known that the manner in which these properties are reflected is additionally dependent upon the particular method employed to form the solid body. Thus, for example, the thermal expansion properties of bodies fabricated by extrusion are such that the CTE is greater in the direction normal to the axis of extrusion than it is parallel to this direction. Conversely, in the process of molding, the CTE of a molded body is greater in that direction that the molding force was applied than perpendicular to that direction.

In providing the insert rods or plugs described in this invention, it is preferable that they be molded rather than extruded. In order to provide the greatest degree of orientation, hence, the highest CTE practicable, it would serve to advantage to mold these rods by a series of successive thrusts and charges rather than by a single thrust molding procedure. This invention further proposes to utilize such carbonaceous aggregates as are known to produce solid systems having singularly high CTE properties, and to use binder and impregnant matrixes known to generate a high CTE.

Figure 2:
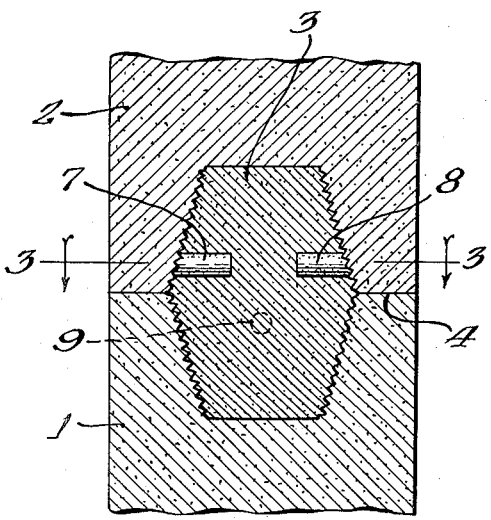
Figure 3:
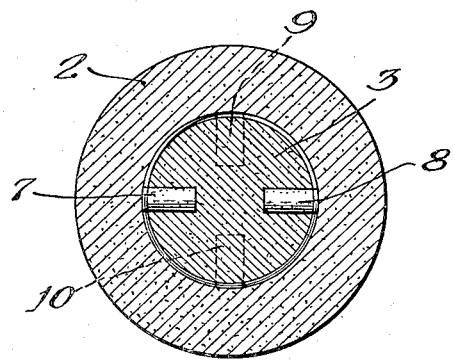
Figure 4:
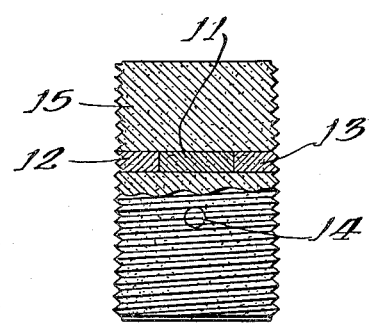

Referring to the drawings which are included in order to illustrate alternative assemblies or constructions which may be employed in carrying out the teachings of this invention, there are shown in Figures 1 and 2 vertical sectional views taken through electrodes joined by nipples, which nipples possess inserts having the high axial or longitudinal CTE characteristics previously discussed. In Figure 1, two such inserts are employed. In Figure 2, four inserts are employed. Figure 3 is a cross-sectional view taken along the lines 3—3 of Figure 2 showing more clearly the positioning of the four inserts. Figure 4 is a vertical sectional view of another type of nipple, insert-pin combination in which the insert-pins employed are part carbon and part graphite and in which the nipple is cylindrical rather than tapered.

Figure 1 shows carbon electrodes 1 and 2 joined by carbon nipple 3 which, in the preferred embodiment of this invention, is threaded into proper size sockets in each of said electrodes. These sockets may be of any convenient configuration such as for example tapered, cylindrical, or a cross between these, depending upon the particular desires of the user. The shape of the nipple employed will of course be the same as that of the socket. The faces of electrodes 1 and 2 abut each other at juncture 4. The nipple 3 has previously been machined or drilled so as to permit the close proximate insertion therein of inserts 5 and 6.

In Figure 2 partial transverse inserts 7, 8 and 9 are employed rather than entirely transverse extending inserts employed in the structure of Figure 1. Figure 3 shows additional insert, 10, opposite 9. This insert has the same relationship to 9 as insert 8 has to insert 7.

Figure 4 is depicted in order to illustrate that the inserts employed in the present invention may readily be of other than one-piece construction and also to illustrate that the nipple (15) may vary greatly in shape. In this embodiment the central or main portion 11 of the insert may be of high CTE baked carbon material while the ends or stubs 12 and 13 (which generally will each be about 1 inch in length) may be made from graphite for easier machinability. The entire system may be readily held together with a cement. The lower insert pin 14 may be as the upper insert pin, or like the pin systems shown in Figures 1 or 2.

As previously stated, with nipples of the prior art it frequently happens that mechanical vibration, etc. causes the uncoupling of electrodes 1 and 2 from nipple 3 leading to adverse and undesired results. Under the present invention, however, the differential expansion of the inserts when the entire assemblage is heated up, sets up a counterforce against this undesired unthreading and in effect increases greatly the amount of torque necessary to commence or continue such undesired unthreading. The torques required to loosen or unwind the electrodes from the nipple having insert pins in accordance with this invention are generally 50 to 100% higher than the torques of similar systems employing no insert pins.

For nipples which are between about 10 and 12 inches at their major diameter or midsection (at juncture 4) the inserts employed will be about one inch in cross section. The axes of the inserts should be substantially transverse, that is, approximately perpendicular to the axis of the nipple and their preferred positions are at points in the nipple reasonably close to where the nipple has its maximum transverse dimension, viz., its major diameter. For a construction such as shown in Figure 1, where only 2 carbon pins or inserts 5 and 6 are used, and for a nipple having a major diameter of 11¾ inches, pins 5 and 6 will generally be about 10 inches long and may vary such as, for example, from about 8 inches to about 11 inches in length. The axis of the bottom pin 6 will preferably be at approximately 90° to the axis of the top pin 5. The outer ends of the inserts will have a terminal contour conform with the contour of the nipple-socket interface. (This will preferably be a threaded fit.) Preferably, however, the inserts are secured in the holes of a nipple blank and the assembly then machined and threaded as an integral unit. The inserts are preferably graphitized to improve machinability.

The pin inserts may also be lightly cemented in the drilled nipples to prevent their falling out during machining and handling.

In Figure 2, inserts are employed which do not go entirely through the nipple 3. Instead, partial inserts such as 7, 8, 9 (and one opposite 9, not shown) are employed. As with the inserts of Figure 1, the longitudinal axes of the bottom inserts are also preferably at approximately 90° to the axes of the top inserts of Figure 2. The axes of the bottom and top inserts of the nipple shown in Figure 4 are also preferably at approximately 90° to each other.

It should be understood, however, that the most important characteristic of the inserts in any of these embodiments is their high axial or longitudinal CTE relative to the transverse CTE of the nipple, and that their angular position relative to each other, number and type of inserts employed are or may be varied to obtain optimum performance under various conditions.

The axial or longitudinal CTE of the insert rods of this invention should be at least 25%–50% greater than the transverse CTE of the nipple, but the force exerted against the inner socket wall during the expansion of the insert rod should be less than that which will crack the electrode socket. Typical suitable ranges of CTE values for the various parts are as follows:

|  | Per ° C. |
|---|---|
| Transverse CTE of electrode stock | $15\text{–}25 \times 10^{-7}$ |
| Transverse CTE of nipple stock | $25\text{–}35 \times 10^{-7}$ |
| Longitudinal CTE of pins or inserts | $40\text{–}80 \times 10^{-7}$ |

These and all subsequent values are the average over the temperature range 25° C.–100° C.

With the foregoing ranges it has been found that the pins or inserts will expand or extend out on each side of the surface of a nipple for about $9/1000$ to about $30/1000$ of an inch, which expansion is sufficient to bring about the aforesaid desired results. (This range typifies the expansion for an insert 8" long, i.e., one that might go into a nipple having a major diameter of 10¾".)

Pertinent typical composition and processing details for making each of the respective elements of the invention are as follows:

An electrode was made by using a coke of the needle structure shown in United States Patent 2,775,549. The electrode was made from 100 parts coke and 36 parts binder. The binder employed was a coal tar pitch used regularly as an electrode binder and had a melting point of 185° F. by the cube in air method, and 25% benzol insoluble material. After graphitization the electrode had a diametrical or transverse coefficient of thermal expansion of $21 \times 10^{-7}$ per ° C.

The nipples of this invention are or may be prepared by mixing together carbon aggregate of such carbons or carbon producing materials as calcined petroleum coke, anthracite, graphite, electrode carbon scrap or the like with a sufficient amount of pitch or bituminous material to serve as a binder. The mixing operation is usually conducted above the melting point of the binder in order to insure uniform distribution of the binder throughout the carbon aggregate. Small amounts of viscous petroleum oils may be added as a lubricant, especially in the event that the nipple stock is to be prepared by extrusion through a die. The extruded or molded "green nipple stock" is baked in order to carbonize the binder after which the baked carbon body may be impregnated with a suitable impregnant after which it may be heated to higher temperatures in order to graphitize the carbon, the carbonized impregnant and the carbonized binder which comprises the nipple stock. The nipple stock may then be machined into a threaded nipple having either a cylindrical form or the tapered form illustrated in Figure 1 or other suitable form. After graphitization such nipples very consistently have a diametrical or transverse coefficient of thermal expansion falling within the previously listed range of between $25-35 \times 10^{-7}$ per ° C.

Insert pins may be made based on one of several alternative formulations. One such pin was made from 100 parts of calcined gilsonite coke at least 52% of which passes a 200 mesh screen, and 35 to 50 parts of coal tar pitch which had the following properties: M.P.: 98-103° C. (cube in air), benzol insolubles: 27-32%. This pin had a CTE of $43.5 \times 10^{-7}$ per ° C. in the axial direction.

A second pin was made from 100 parts of a somewhat coarser sized ground raw petroleum coke having a volatile content of approximately 13%, and 10-15 parts of a suitable plasticizing hydrocarbon such as anthracene, etc. This pin had a CTE of $58 \times 10^{-7}$ per ° C.

A third pin was made from a mixture of 75 parts graphite and 25 parts of Thermax, a registered trademark of the Vanderbilt Company for carbon black, said mixture ground to a particle size wherein at least 52% passes a 200 mesh screen, and 30 parts of −10 mesh coal tar pitch, said pitch having a melting point of 98-103° C. (cube in air method) and 27-32% benzol insolubles. This pin also had a CTE of $58 \times 10^{-7}$ per ° C.

Pins having the foregoing typical compositions and having an axial CTE as high as $80 \times 10^{-7}$ per ° C. can be processed by a continuous molding procedure whereby compaction of the green charge is brought about by direct compression in a confining tubular mold. Rods of suitable length may be prepared by this method.

The electrodes and nipples of this invention will generally be extruded, whereas the insert rods will generally be molded. All will generally be baked, pitch impregnated and then graphitized.

Although this invention has been illustrated by citing specific details embraced within the scope of the invention, it is to be understood that various modifications within the invention are possible, some of which have been referred to above; therefore, I do not wish to be limited except as defined by the appended claims.

I claim:

1. A mechanism for joining two socketed carbon electrodes comprising a carbon coupling nipple, a portion of which closely fits into the socket of each electrode and at least one carbon rod inserted transversely in each of said portions of said nipple, the axial coefficient of thermal expansion of said rods being substantially higher than the transverse coefficient of thermal expansion of said nipple.

2. A mechanism according to claim 1 wherein the transverse CTE range of said nipple is from $25 \times 10^{-7}$ to $35 \times 10^{-7}$ per ° C. and the axial CTE range of said inserts is from $40 \times 10^{-7}$ to $80 \times 10^{-7}$ per ° C.

3. A mechanism according to claim 1 wherein there are two insert rods, one of which extends entirely through each portion of said nipple.

4. A mechanism according to claim 1 wherein there are two insert rods in each portion of the nipple, said rods extending only partially through said portions of said nipple.

5. A mechanism according to claim 1 wherein there are two insert rods, one of which extends entirely through each portion of said nipple, and at least one of which has a baked segment in the middle and graphitized segments at the ends.

6. A mechanism according to claim 3 wherein the axis of the insert in one portion of the nipple is at approximately 90° to the axis of the insert in the other portion of the nipple.

7. A mechanism according to claim 4 wherein each of the inserts in the same portion of the nipple lie approximately on the same axis, which axis is at approximately 90° to the axis of the inserts in the other portion of the nipple.

8. A mechanism according to claim 5 wherein the axis of the insert in one portion of the nipple is at approximately 90° to the axis of the insert in the other portion of the nipple.

9. In a connecting joint between sections of an electric furnace electrode comprising electrode sections, a nipple threaded into a socket in each section holding abutting faces of said sections in contact, the improvement comprising at least one carbon rod inserted transversely in a portion of the nipple in each socket, the axial coefficient of thermal expansion of said rods being substantially higher than the transverse coefficient of thermal expansion of said nipple.

10. An electrode joint according to claim 9 wherein the axis of the insert in one portion of the nipple is at approximately 90° to the axis of the insert in the other portion of the nipple.

References Cited in the file of this patent

UNITED STATES PATENTS

| | | |
|---|---|---|
| 2,093,390 | Wyckoff | Sept. 14, 1937 |
| 2,421,105 | Warren | May 27, 1947 |
| 2,744,945 | Johnson | May 8, 1956 |